United States Patent Office 2,735,191
Patented Feb. 21, 1956

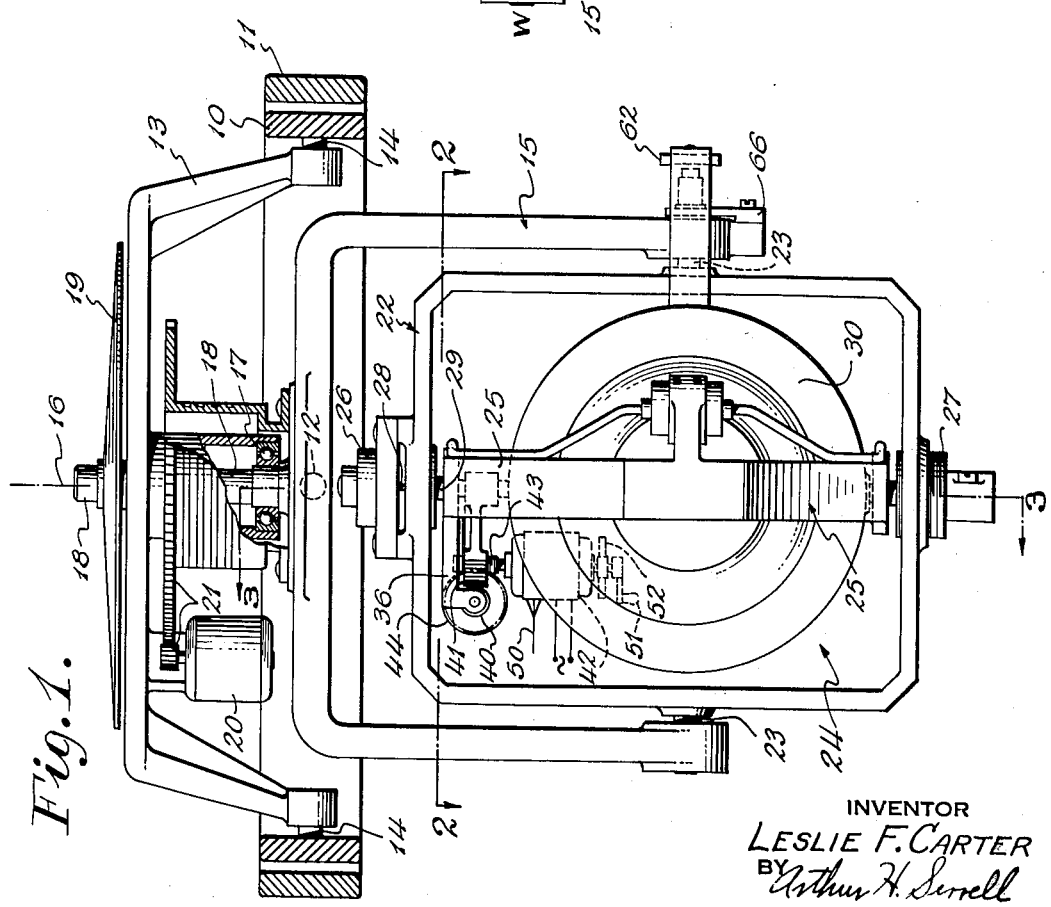
Feb. 21, 1956
L. F. CARTER
2,735,191
GYROSCOPIC COMPASS INSTRUMENT
Filed Dec. 10, 1952
2 Sheets-Sheet 1
INVENTOR
LESLIE F. CARTER
BY Arthur H. Serrell
ATTORNEY

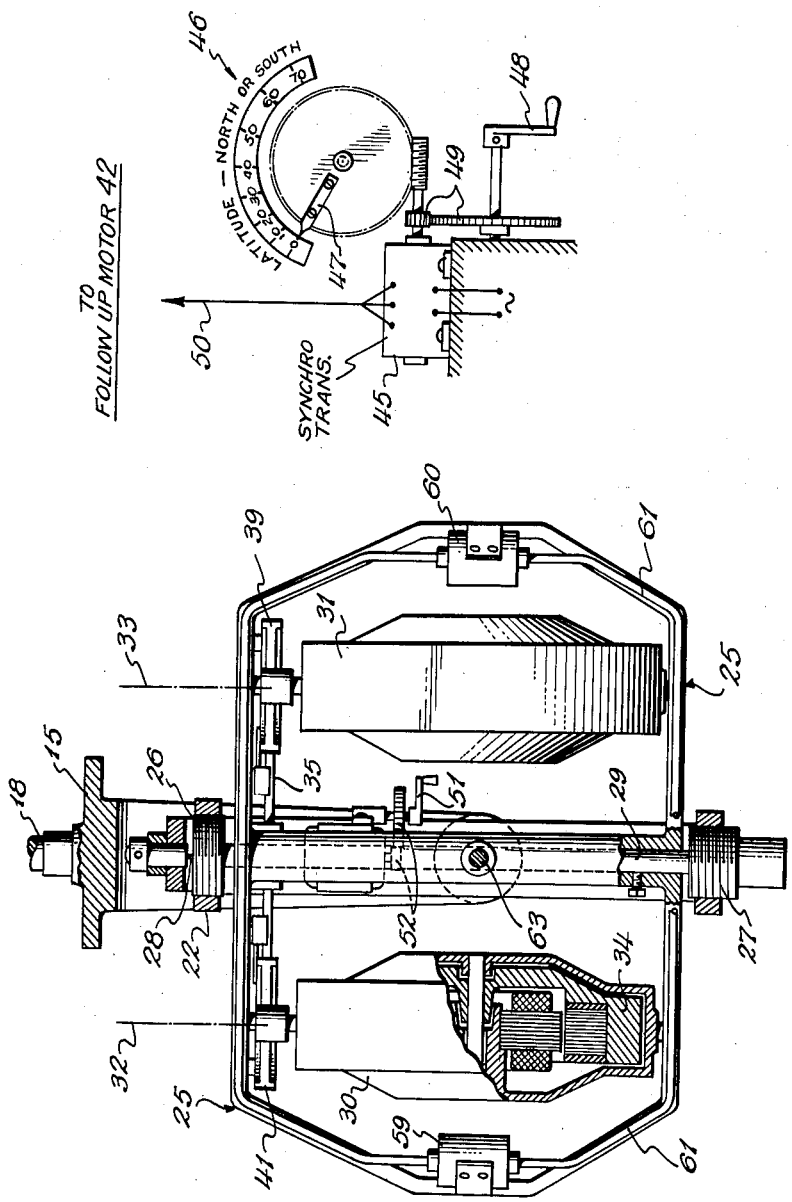

2,735,191

GYROSCOPIC COMPASS INSTRUMENT

Leslie F. Carter, Leonia, N. J., assignor to Sperry Rand Corporation, a corporation of Delaware Application December 10, 1952, Serial No. 325,153

8 Claims. (Cl. 33—226)

My present invention relates generally to gyroscopic compass instruments of the character employed in navigable craft to provide a directional or other reference. More particularly, the invention concerns an improvement in instruments of the type shown and described in my Patent No. 2,682,115, dated June 29, 1954, which employs an inverted gimbal support and a torsion suspension for the sensitive element of the compass.

Heretofore in instruments of this character a constant period has been maintained with changes in latitude of the craft by either employing a fixed ballistic moment and altering the speed of the gyroscopic rotor of the instrument with latitude change or by maintaining the rotor at a constant speed and varying the ballistic moment of the instrument. The period of the improved compass is maintained constant by varying the gyroscopic angular momentum of a sensitive element of the twin rotor frame type with changes in latitude of the instrument. Maximum angular gyroscopic momentum is existent at the equator where the normally horizontal spin axis of the rotors of the interconnected frames of the sensitive element are situated in an aligned relation. Within the useful range of operation of the instrument from 0° latitude to 70° latitude, an interconnection between the frames adjusts the angular relation between the spin axes of the rotors of the frames so that the angular momentum of the sensitive element decreases as the latitude increases to maintain the period of the instrument constant. The angle of spread between the spin axes of the respective rotors from 180 degrees to 18 degrees represents the difference between compass operation at the equator and 70° latitude to obtain the necessary variation in angular momentum of the sensitive element. In the improved instrument, both rotors spin in an anti-earthwise direction.

A further feature of the invention resides in the provision of means for modifying the damping factor of the improved compass responsive to the momentum adjusting means.

Other features and structural details of the invention will be apparent from the following description when read in connection with the accompany drawings, wherein:

Fig. 1 is a south elevation view partly in section of a gyroscopic compass instrument constructed in accordance with the present inventive concepts;

Fig. 2 is a horizontal section view taken in line 2—2, Fig. 1;

Fig. 3 is a vertical section view of the improved compass taken on lines 3—3, Fig. 1; and Fig. 4 is a detail elevation view of a remote controller for the improved compass instrument.

As shown, the compass includes the conventional gimbal ring 10 mounted within a binnacle ring 11 on a trunnion axis 12 that is normal to the paper in Fig. 1. It will be understood that ring 11 of the instrument is a part of the fixed binnacle or housing (not shown) that is fixedly secured to the craft on which the compass is employed. The compass spider 13 is pivoted within gimbal ring 10 on a second horizontal trunnion axis 14. The phantom ring 15 or follow-up member of the improved compass instrument is mounted on the spider element 13 with freedom about an azimuth axis 16 by means of a pair of spaced bearing connections one of which is indicated at 17. The stub shaft 18 of the phantom ring 15 extends above the spider element 13 and includes thereon a conventional compass card 19. A conventional electric motor 20 or other suitable motive means is fixedly mounted on the spider element 13 and operatively connected to the phantom ring or follow-up member 15 by way of suitable gearing 21. As shown in Fig. 1, the large gear of the connecting gearing 21 is formed as part of a hollow tubular slip ring mounting element that is fixedly connected to the phantom ring 15. The twin gyroscopic rotors utilized on the sensitive element of the instrument may be driven by suitable A. C. induction motors as shown in Fig. 3 by energy fed thereto by way of the slip ring mounting element.

According to the disclosure in my hereinbefore identified copending application, the major pivotal axis between the spider element 13 and the sensitive element of the compass is horizontal instead of vertical as in usual gyroscopic compass instruments. As herein shown, a vertical ring 22 is mounted on the phantom ring or follow-up member 15 with freedom about a horizontal axis as defined by trunnions 23. The sensitive element of the instrument is generally indicated at 24 in Fig. 2. This element includes a frame 25 that is mounted on the vertical ring 22 with freedom about a vertical axis coincident with the azimuth axis of the phantom ring 15. The means for mounting the element 24 includes upper and lower guide bearings generally designated at 26 and 27 respectively and a torsion suspension wire 28 supporting the element at the bottom from the top of the ring 22. Wire 28 extends the height dimension of the sensitive element through a tube 29, Figs. 2 and 3, which is fixedly connected to the frame 25 by means of set screws or otherwise. This construction forms a part of the subject matter of my hereinbefore identified copending application and consequently is not illustrated herein in greater detail than to show the individual components. The purpose of the wire 28 in the structure is to avoid exerting a twist on the sensitive element 24 when the phantom ring 15 is not in proper azimuthal orientation with the sensitive element.

In accordance with the present inventive concepts, the sensitive element of the improved compass includes a pair of rotor frames designated at 30 and 31 mounted on frame 25 for adjustment about the respective spaced vertical axes 32 and 33, Fig. 3. One of the rotors of the twin rotor frames is shown in Fig. 3 at 34. The rotor spin axes of the respective gyroscopic components of the compass are normally horizontal. In the full line position of the parts shown in Figs. 1, 2 and 3, the spin axes of the rotors of frames 30 and 31 are in an aligned condition and the angular gyroscopic momentum of the device is at a maximum. The interconnecting means between the frames is adjusted to obtain this condition of the frames when the craft employing the improved compass is on the equator or a 0° latitude. In accordance with the invention, the period of the instrument is maintained constant with varying latitude by decreasing the angle of spread A, Fig. 2, between the spin axes of the twin rotor frames so as to decrease the angular momentum of the sensitive element as the latitude increases. The setting of the frames 30 and 31 is such that at 70° latitude the spread angle A may be 18 degrees. The gyroscopic momentum of the sensitive element has then been reduced to its lowest usable value.

As shown, the interconnecting device for the frames 30, 31 is one that is operable to move the frames correspondingly and in opposite sense about their respective vertical axes 32 and 33. The momentum modifying means illustrated includes a rotatable member or shaft 35 mounted between bracket defining extensions 36, 37 of the frame 25 of the sensitive element. A drive connection between the shaft 35 and rotor frame 31 includes worm gear 38 and sector gear 39, the gear 38 being fixed to the shaft and the gear 39 being fixed to the upper trunnion of the rotor frame 31. Similarly, a second drive connection connects shaft 35 and frame 30 for movement in a reverse sense. This connection includes a worm gear 40 fixed to shaft 35 and a meshing sector gear 41 fixed to the upper trunnion of the rotor frame 30. Shaft or member 35 of the angular momentum modifying means is positioned in accordance with the latitude of the instrument. As shown, the modifying means further includes a repeater motor 42 fixed to the frame 25 of the sensitive element whose output shaft is operatively connected to shaft 35 by way of worm 43 and gear 44 on the central part of shaft 35. Motor 42 is operated by the output of an electrical synchro transmitter 45 of conventional form which may be remotely located relative to the compass instrument. As shown in Fig. 4, the rotor of transmitter 45 is related to a latitude indicator 46 whose pointer 47 is gear connected to the rotor. A crank 48 is also connected to the synchro rotor and pointer 47 by way of suitable gearing 49, the same facilitating the setting of the pointer 47 to the latitude of the instrument and simultaneously providing an output from the transmitter that is fed by way of leads 50 to the repeater motor 42 until the shaft 35 is positioned corresponding to the setting in the indicator 46.

The latitude setting of the frames 30 and 31 can also be accomplished within the instrument by means of a settable member or crank 51, Fig. 3, on the frame 25 of the sensitive element that is connected to shaft 35 through the shaft of motor 42 and suitable gearing 52. In this instance, the latitude indicator comprises scale and pointer parts 53 and 54, one of which is fixed to one of the rotor frames and the other of which is fixed to the sensitive element. In the structure shown, the pointer 54 is fixed to the frame 25 of the sensitive element 24 and the latitude scale 53 is located on the sector gear 39 portion of the rotor frame 31. Crank 51 may be employed to set shaft 35 so that the spread angle A of the rotor frames is correct for the latitude of the instrument as represented in this instance by the reading of latitude scale 53 and pointer 54.

Latitude scale 53 and the corresponding portion of the indicator 46 are calibrated in accordance with a cosine function of the latitude of the craft between the values of zero degrees latitude and seventy degrees latitude. This is in accordance with the factor of latitude contained in the gyro compass period formula:

$$T = 2\pi \sqrt{\frac{I\omega_1}{Wl\omega_2 \cos L}}$$

where T is the constant period of the instrument in minutes, I is the variable moment of inertia of the two gyros, $\omega_1$ is the constant angular speed of the gyros, $Wl$ is the pendulous factor of the gyros which in this instant is constant, $\omega_2$ is a constant proportional to the angular velocity of the earth, and cos L is the cosine of the latitude of the craft.

In accordance with the present inventive concepts, the improved instrument includes means responsive to the momentum adjusting means interconnecting the rotor frames 30, 31 for modifying the damping factor of the compass. As shown in Fig. 2, such means comprises a movable mass situated on the frame 25 of the sensitive element 24 in the form of a pair of weights 55 and 56 that are connected to the respective sector gears 39 and 41 by the spacing arms 57 and 58. The westerly position of the mass as provided by the weights 55, 56 is determined in accordance with the latitude adjustment of the shaft 35. With the compass at the equator the weights 55, 56 lie in a vertical plane including the axis of the sensitive element and the rotor frames 30, 31, the factor in this instance being null. With movement of the shaft 35 and corresponding positioning of the sectors 39, 41, the weights 55, 56 move out of the defined plane so that the damping factor increases as the latitude increases within the latitude range of effectiveness of the gyroscopic compass.

Meridian seeking properties are provided for the compass by any suitable form of fixed ballistic or pendulous factor. As shown particularly in Figs. 2 and 3, the pendulous factor of the compass may comprise mercury containers 59 and 60 that are secured to the east side of the frame 25 by suitable brackets. The containers 59 and 60 are connected by a tube having a restriction therein as is well-known in the art.

The controller employed for the follow-up drive motor 20 connected to the phantom ring or follow-up member 15 may be of the character shown and described in my hereinbefore identified pending application. In the construction illustrated in Fig. 2, the armature element 62 of an inductive pick-off between the follow-up member 15 and sensitive element 24 is connected to the frame 25 of the element by an eastwardly extending screw threaded rod 63 on the end of which a ring element 64 is suitably secured. The ring 64 encircles the vertical ring 22 and phantom ring 15 and carries the armature part of the pick-off thereon. The stator 65 of the pick-off is mounted on the member 15 by means of a suitable bracket 66. The output of the pick-off is fed by way of suitable leads (not shown) in a conventional manner to operate the motive means 20 and thusly maintain the follow-up member 15 and card 19 oriented in azimuth with the sensitive element 24 of the instrument. The adjustable nut 67 on rod 63 provides a balancing weight for the sensitive element of the instrument.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A fixed ballistic gyroscopic compass instrument comprising a follow-up member mounted with freedom about an azimuth axis, a vertical ring mounted on said member with freedom about horizontal axis, a sensitive element having twin rotor frames with normally horizontal rotor spin axes and respective spaced vertical axes, means for mounting said element on said ring with freedom about a vertical axis including upper and lower guide bearings and a torsion suspension supporting the element at the bottom from the top of the ring, means interconnecting the frames for adjusting the angular momentum of the sensitive element in accordance with the latitude of the instrument, means responsive to said momentum adjusting means for modifying the damping factor of the instrument, a peak-off between said follow-up member and sensitive element, and motive means operatively connected to said follow-up member responsive to the pick-off for maintaining said member oriented with said sensitive element.

2. In a gyroscopic compass instrument, the combination of a follow-up member mounted with freedom about an azimuth axis, a vertical ring mounted on said member with freedom about a horizontal axis, a sensitive element mounted on said ring with freedom about a vertical axis having twin rotor frames with normally rotor spin axes and respective spaced vertical axes, and period maintaining means interconnecting the frames operable to adjust the angular relation between the rotor spin axes of the frames in accordance with the latitude of the instrument.

3. In a gygroscopic compass instrument, the combination of a follow-up member mounted with freedom about an azimuth axis, a vertical ring mounted on said member with freedom about a horizontal axis, a sensitive element mounted on said ring with freedom about a vertical axis having twin rotor frames with normally horizontal rotor spin axes and respective spaced vertical axes, means interconnecting the frames for adjusting the angular momentum of the sensitive element in accordance with the latitude of the instrument, and means responsive to said momentum adjusting means for modifying the damping factor of the instrument.

4. In a gyroscopic compass instrument, a sensitive gyroscopic element having twin rotor frames with normally horizontal rotor spin axes and respective spaced vertical axes, a device on said element interconnecting said frames to move the same correspondingly and in opposite senses about their respective vertical axes and accordingly modify the angular momentum of the sensitive element, and means for operating said device including indicating means settable in accordance with the latitude of the instrument.

5. A gyroscopic instrument of the character claimed in claim 4, including a movable mass on said element for modifying the damping factor of the instrument positioned in accordance with the latitude setting of said operating means.

6. In a constant period gyroscopic compass instrument, a sensitive element having a pair of rotor frames thereon movable about spaced vertical axes, means for modifying the gyroscopic angular momentum of the sensitive element including a rotatable member mounted on said element, a drive connection between said member and the first frame operable to move the frame about its vertical axis, a second drive connection between said member and the second frame operable to move the second frame about its vertical axis correspondingly to the motion of the first frame and in a reverse sense and means for positioning said rotatable member including indicating means settable in accordance with the latitude of the instrument.

7. A gyroscopic instrument of the character claimed in claim 6, including means for changing the damping factor of the instrument comprising a pair of movable weights, one of which is included as a part of the first drive connection and the other of which is included as a part of the second drive connection.

8. In a constant period gyroscopic compass instrument, a sensitive element supported with freedom about an azimuth axis having a pair of rotor frames thereon adjustable about spaced vertical axes to change its gyroscopic angular momentum, a settable member on said element for effecting the adjustment of said rotor frames, and a latitude indicator having pointer and scale parts, one of which is fixed to one of the rotor frames and the other of which is fixed to the sensitive element.

References Cited in the file of this patent

UNITED STATES PATENTS 2,263,232   Bolster _____ Nov. 18, 1941